(12) United States Patent
Kestenbach et al.

(10) Patent No.: US 11,074,820 B2
(45) Date of Patent: Jul. 27, 2021

(54) LOW/NO VISIBILITY TAKEOFF SYSTEM

(71) Applicant: Embraer S.A., São José dos Campos-SP (BR)

(72) Inventors: Thomas Kestenbach, São José dos Campos (BR); Luiz Gustavo Medeiros Carneiro, São José dos Campos (BR); Patrice London Guedes, São José dos Campos (BR); Jose Roberto Ferreira de Camargo Clark Reis, São José dos Campos (BR); Rubens Monteiro De Souza Junior, São José dos Campos (BR); Nelson Barbosa, São José dos Campos (BR)

(73) Assignee: Embraer S.A., Sâo José dos Campos-SP (BR)

( * ) Notice: Subject to any disclaimer, the term of this patent is extended or adjusted under 35 U.S.C. 154(b) by 90 days.

(21) Appl. No.: 16/226,141

(22) Filed: Dec. 19, 2018

(65) Prior Publication Data

US 2020/0202726 A1 Jun. 25, 2020

(51) Int. Cl.
*G08G 5/00* (2006.01)
*G05D 1/08* (2006.01)
*G08G 5/06* (2006.01)
*G05D 1/00* (2006.01)
*G05D 1/06* (2006.01)

(52) U.S. Cl.
CPC ......... *G08G 5/0065* (2013.01); *G05D 1/0083* (2013.01); *G05D 1/0808* (2013.01); *G08G 5/0021* (2013.01); *G08G 5/065* (2013.01); *G05D 1/0661* (2013.01)

(58) Field of Classification Search
None
See application file for complete search history.

(56) References Cited

U.S. PATENT DOCUMENTS

| | | | |
|---|---|---|---|
| 8,560,149 B1 * | 10/2013 | Ganguli | G05D 1/0083 701/15 |
| 2006/0214063 A1 * | 9/2006 | Firuz | G05D 1/0083 244/175 |
| 2011/0040431 A1 * | 2/2011 | Griffith | G05D 1/0661 701/15 |
| 2020/0027362 A1 * | 1/2020 | Dame | G01C 21/20 |
| 2020/0122820 A1 * | 4/2020 | Dame | G08G 5/0065 |

OTHER PUBLICATIONS

Flight Controls, SKYbrary, Jul. 27, 2017, pp. 1-3. (Year: 2017).*
Fly-By-Wire, SKYbrary, Dec. 28, 2017, pp. 1-7. (Year: 2017).*

* cited by examiner

*Primary Examiner* — Kevin P Mahne
(74) *Attorney, Agent, or Firm* — Nixon & Vanderhye PC (57) ABSTRACT

A no/low visibility automatic takeoff system for an aircraft obtains a runway reference centerline and aircraft pointing direction (via the aircraft's sensors) and automatically controls the aircraft pointing direction to track the runway reference centerline. An initial vector is obtained based on the initial position of the aircraft the first piloted initiation of the takeoff roll. After the system obtains a centerline, it automatically tracks the centerline and corrects aircraft trajectory so the aircraft heading closely matches the runway centerline as the aircraft proceeds down the runway.

18 Claims, 10 Drawing Sheets

LOW/NO VISIBILITY TAKEOFF SYSTEM

CROSS-REFERENCE TO RELATED APPLICATIONS

This application is related to U.S. Pat. No. 8,793,040 B2 "Climb-optimized auto-takeoff system" and U.S. patent application Ser. No. 15/273,986—"Enhanced takeoff system" filed Sep. 23, 2016, both incorporated herein by reference as if expressly set forth.

STATEMENT REGARDING FEDERALLY SPONSORED RESEARCH OR DEVELOPMENT

None.

FIELD

The non-limited technology described herein is related to the field of autonomous takeoff of aircraft, e.g., with the purpose of reducing the workload for the crew during this demanding phase of flight and allowing for operation in Low and/or No Visibility conditions.

BACKGROUND & SUMMARY

Aircraft are expected to operate under all different kinds of weather conditions including heavy rain, fog, smog, snow, etc. Some airports are often subject to weather conditions that limit visibility. FAA and other international air safety administrators have defined procedures to ensure safe Low Visibility Takeoff (LVTOs).

As a flight prepares for takeoff, the crew and the aircraft's avionics system must reevaluate a plurality of parameters—within and outside of the aircraft—in order to assure a safe dispatch. In some conditions, where visibility on the tarmac is low, certain Low Visibility Procedures (LVPs) should be applied for the purpose of ensuring a safe operational takeoff. Such LVPs are put in place to support Low Visibility Operations at tarmacs when either surface visibility is sufficiently low (e.g., snow on the surface of the runway) or when the cloudbase (e.g., clouds, fog, etc.) is sufficiently low that it prevents the pilots from obtaining required visual references.

On tarmacs where the ground markings and lighting are adequate, ground traffic at reasonable flow rates can often be sustained safely in reduced visibility conditions. One way to maintain safe operations during low visibility conditions is to require that aircraft have the correct runway alignment before taking off. Aircraft are under some circumstances able to align with the tarmac centerline by generating reference points on the surface of the tarmac. Apart from the centerline alignment, the aircraft should take the runway visibility range ("RVR") into account to prevent collisions with objects on the tarmac.

LVTO Procedures and Intervals

During poor environmental conditions, a Low Visibility Takeoff (LVTO) procedure is required to assure operational integrity. By regulation, LVTO is generally defined as a takeoff with a Runway Visibility Range (RVR) less than 400 meters but not less than 75 meters. Such LVPs including for LVTO's have been mandated to reduce the risk of accidents.

Figure 1:
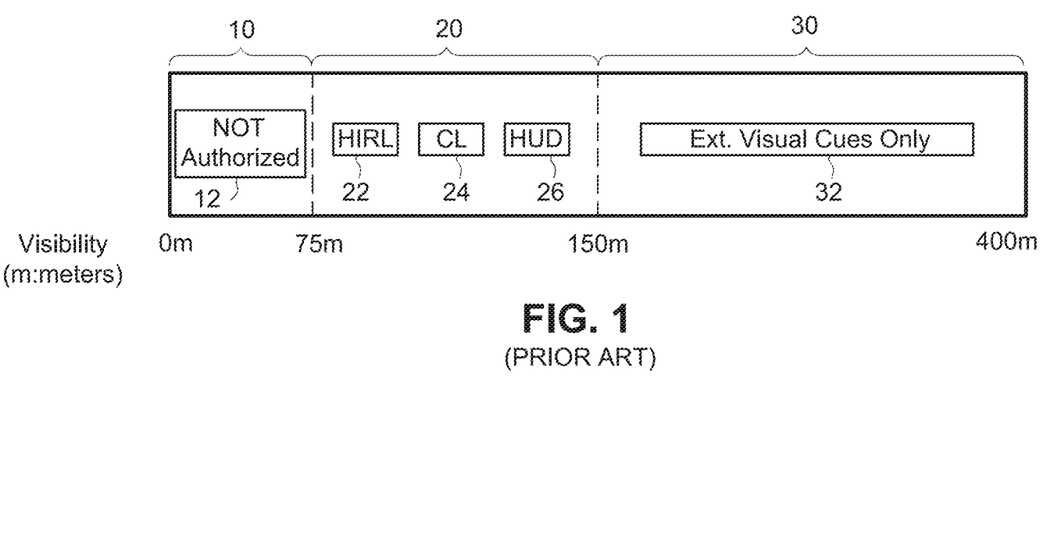
FIGS. 1 and 1A show example prior art Runway Visibility Range (RVR) intervals used to determine takeoff requirements in low visibility conditions.
Figure 1A:
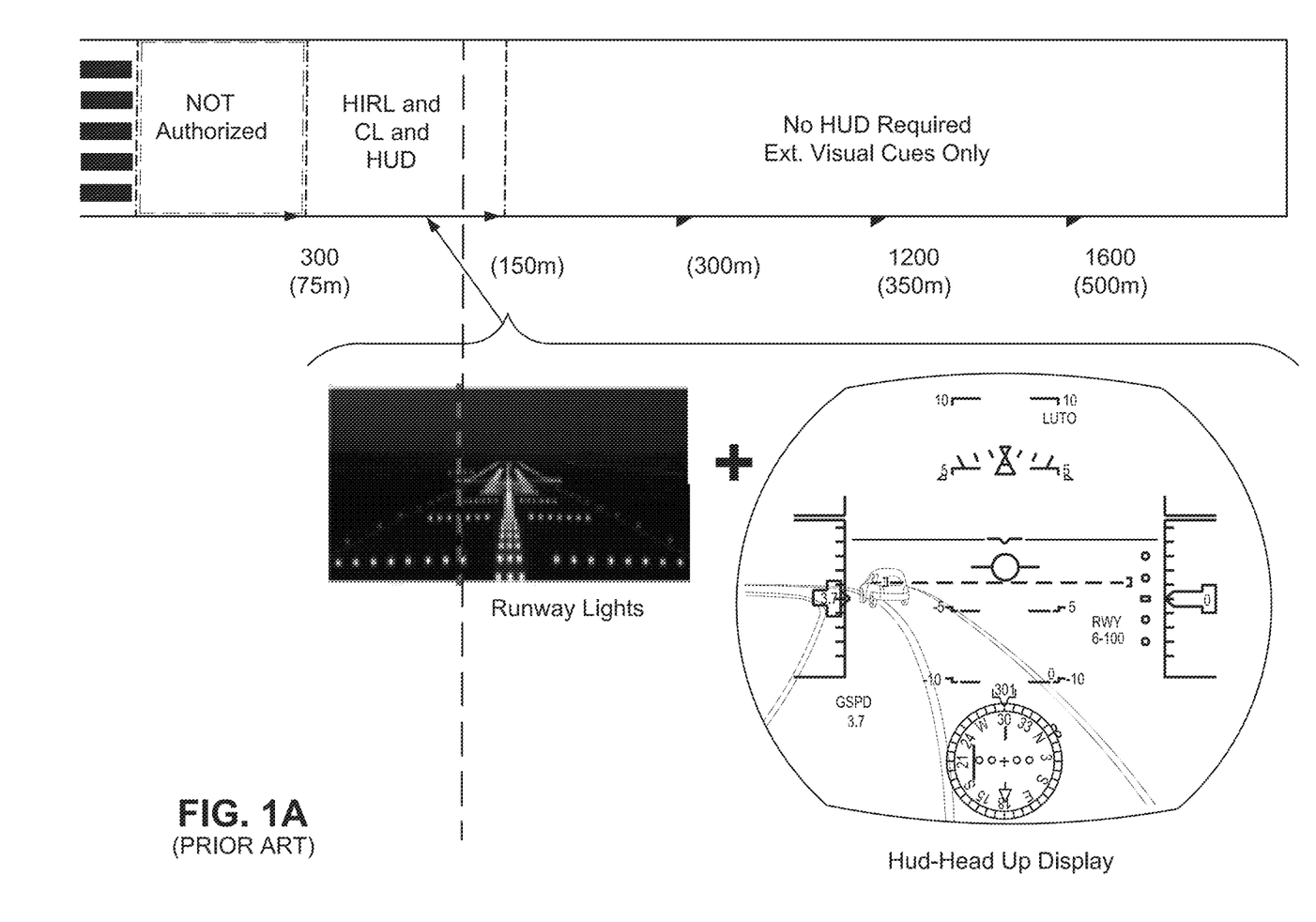
Figure 1B:
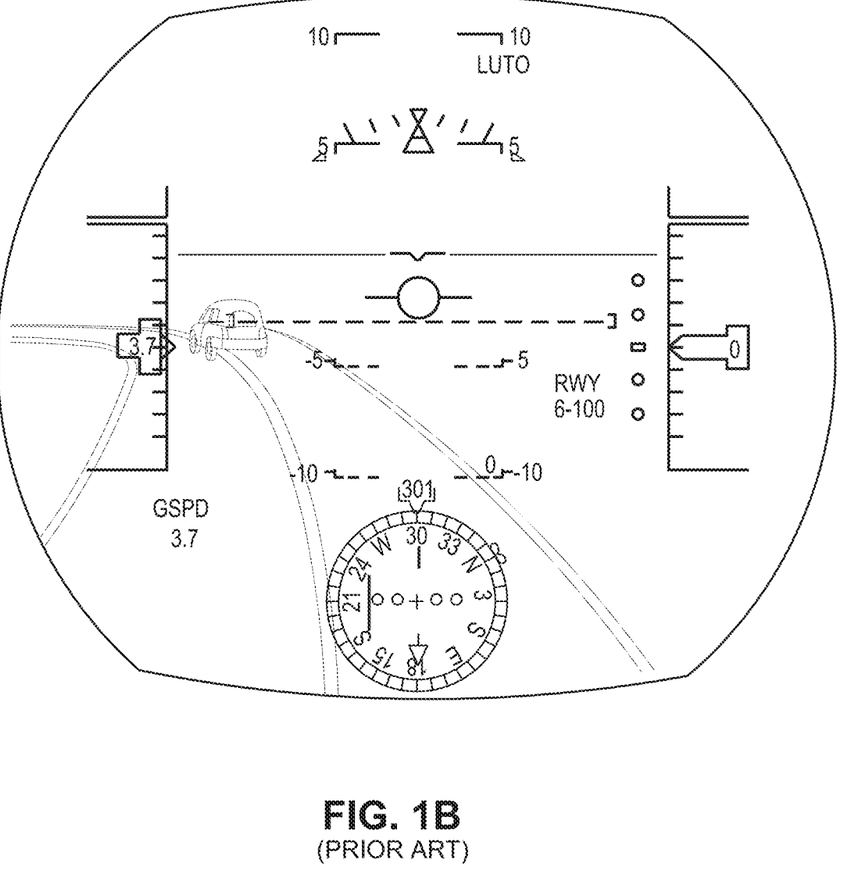
FIG. 1B shows an enlarged view of the FIG. 1A prior art Heads Up Display.

LVTO procedures have different intervals for different visibility ranges; each interval has a set of requirements to guarantee a safe takeoff See FIGS. 1 and 1A showing that a LVTO with a visibility interval of 150 meters and more does not require the assistance of the Head-Up Display (HUD), only external visual cues. With a visibility interval of 75 meters up to 150 meters, HUD assistance (as shown in FIG. 1A, 1B) is required along with, High Intensity Runway Lights (HIRL) and Center Lights (CL) for a safe takeoff. No takeoff of commercial aircraft is currently allowed when visibility is lower than 75 meters. This hinders the productivity, economically and operationally, of many airports and communities that are subjected to constant low visibility scenarios (fog, smog, heavy rain, etc.) throughout the year.

Meanwhile however, the potential for accidents in low or no visibility takeoff conditions is real. The biggest air disaster in history occurred on a foggy day in March 1977, when two passenger jets (Pan Am Flight 1736 and KLM Flight 4805) collided on the runway of Tenerife North Airport, Canary Islands. That collision occurred when KLM 4805 initiated its takeoff run while Pan Am 1736, shrouded in fog, was still on the runway and about to turn-off onto the taxiway. Five hundred and eighty-three people were killed in that collision. This kind of accident can happen in low visibility takeoff situations unless precautions are taken.

The ion-limiting technology herein provides the ability to take off in conditions where visibility is none or limited, while doing it safely to help prevent catastrophes like the Tenerife disaster.

BRIEF DESCRIPTION OF THE DRAWINGS

The present disclosure describes example non-limiting systems and methods related to automatic takeoff capabilities of an aircraft. Certain specific details are set forth in the following descriptions and FIGS. 1-8 to provide a thorough understanding of various embodiments of the technology. Well-known structures, systems, and methods often associated with such systems have not been shown or described in detail to avoid unnecessarily obscuring the description of the various embodiments of the technology. In addition, those of ordinary skill in the relevant art for understand that additional embodiments of the technology may be practiced without several of the details described below.

The following detailed description of exemplary non-limiting illustrative embodiments is to be read in conjunction with the drawings of which.

DETAILED DESCRIPTION OF PREFERRED EMBODIMENTS

Automating a LVTO would reduce the crew's required high workload during takeoff, allowing the pilots to control other operational aspects during this intense phase of flight. Automating an LVTO would also allow operation in conditions below 75 meters, which are not allowed today by any existing system. In many cases, automating the LVTO system for no-visibility or low-visibility takeoffs could prevent the loss of lives and equipment due to accidents induced by poor visibility takeoff conditions.

The example non-limiting technology herein provides a no/low visibility automatic takeoff system that obtains a runway reference centerline and aircraft pointing direction (via the aircraft's sensors) and automatically controls the aircraft pointing direction to track the runway reference centerline.

The example non-limiting system obtains a reference centerline and pointing direction, based on the airplane's own sensors and provides an initial vector which is obtained based on the initial position of the aircraft the first piloted initiation of the takeoff roll. After this system obtains a centerline, it tracks it based either on method 1 or method 2:

Method 1:

Given a centerline reference, the system will act on the control surfaces (ailerons, roll spoilers, rudder, nose steering, etc.) in order to minimize the lateral distance from the airplane and the reference centerline During the ground roll, the lateral control surfaces are used secondarily to help control, based on a prescribed control logic.

Once in air, the control law will act on both the lateral and the directional control surfaces primarily, in order to track a heading "$\psi$" and a bank "$\phi$" references.

Method 2:

Given a centerline reference, the system will act on the control surfaces (ailerons, roll spoilers, rudder, nose steering, etc.) in order to track a heading reference thus keeping the airplane within runway limits, parallel to the centerline. It shall measure, through the aircraft sensors, the heading angle "$\psi$", compare it to the reference angle, obtained at the initiation of the takeoff roll, and apply a control logic through the FBW computer to reduce the error between the current measured "$\psi$" and the reference "$\psi$".

During the ground roll, the lateral control surfaces are used secondarily to help control, based on a prescribed control logic.

Once in air, the control law will act on both the lateral and the directional control surfaces primarily, in order to track a heading "$\psi$" and a bank "$\phi$" references.

Before explaining example implementations, the following background information concerning low visibility takeoff (LVTO) procedures may be helpful.

FIGS. 1 & 1A show three different intervals of visibility during Low Visibility Takeoffs (LVTOs) and requirements necessary for a safe dispatch in each interval. The RVR regulations mandate that for a fair-visibility range 30—a visibility interval defined from 400 meters down to 150 meters—only external visibility cues (e.g., threshold 210, touch down zone 230, fixed distance markers 240, etc.) are necessary. For a fair-visibility range 20, defined by a visibility interval of 149 meters down to 75 meters, runway markers (e.g., High Intensity Runway Lights (HIRLs) 22, Center Lights (CLs) 24, and Head-Up Display (HUD) 26) are obligatory for a takeoff (certain of these marker objects are usually integrated into the runway). In the no-visibility range 10 (i.e., a visibility interval of anything less than 75 meters), no commercial aircraft are authorized 12 for takeoff. The non-limited technology described herein has been design so that takeoffs in all types of RVRs, from no-visibility to full-visibility, are possible.

The non-limiting technology herein provides a system that allows low, and even zero, visibility takeoff without precision vision instrument guidance systems (e.g., HUD.) In relevant prior art, Embraer has put forth methods related to takeoff automation regarding longitudinal (pitch) and lateral (roll) axes. Although the present non-limited proposed method is independent of such other Embraer methods, it complements the takeoff automation through the utilization of the runway centerline. Note that, although this non-limiting technology allows for a takeoff with low or even no visibility, the system can be used in conjunction with Embraer automatic takeoff systems even in good visibility conditions. This will complement other Embraer methods to eliminate the human pilot action at takeoff, since it provides an automation in the directional axis (yaw), allowing the human pilot to monitor the takeoff and make top level decisions instead of performing manual takeoff actions.

Example No/Low Visibility Automatic Takeoff System

Figure 5:
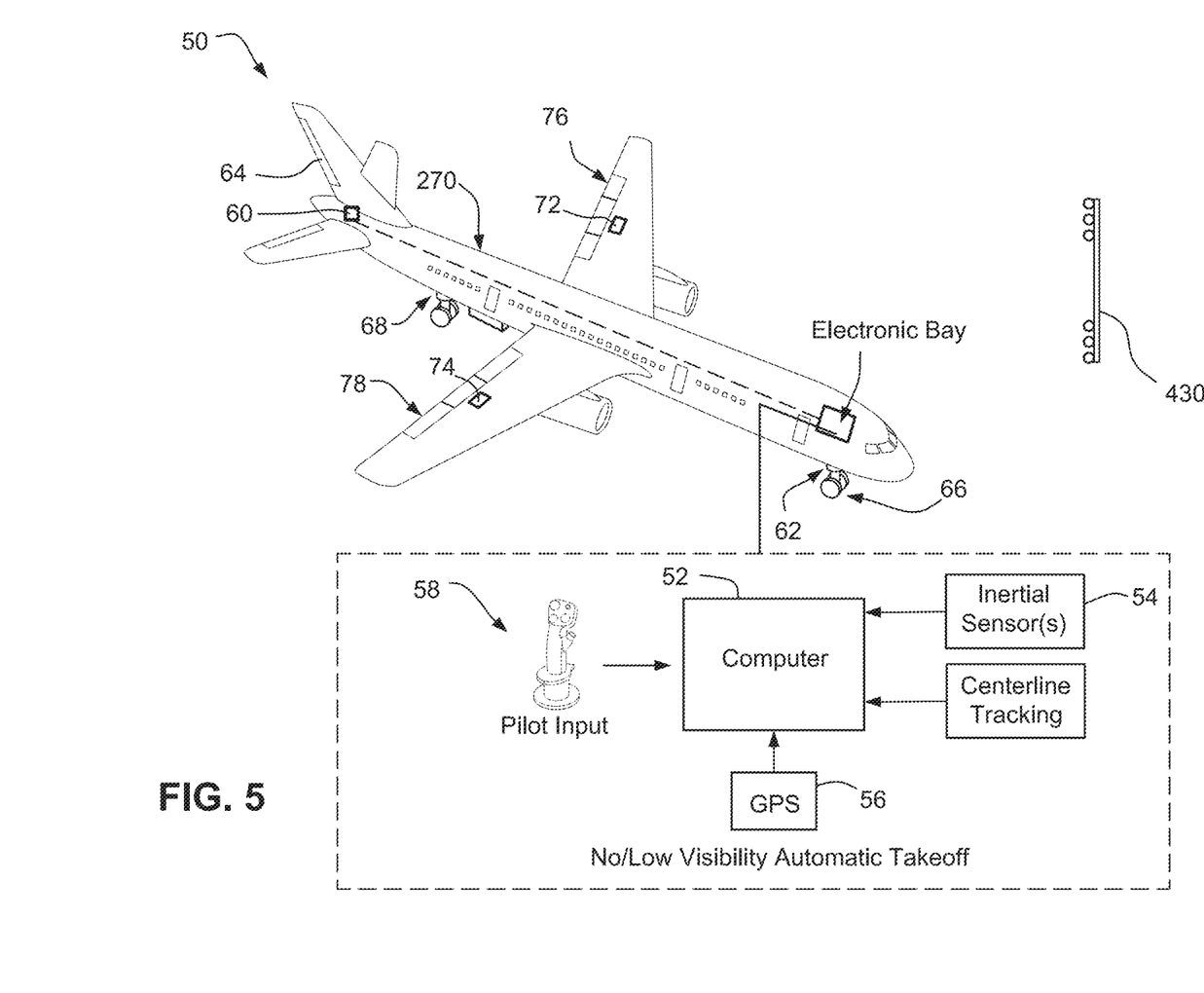
FIG. 5 shows an example non-limiting no/low visibility automatic takeoff system.

FIG. 5 shows an example non-limiting No/Low Visibility Automatic Takeoff System 50. An aircraft includes an onboard computer 52 that receives inputs from sensors including inertial sensor(s) 54, an enhanced GPS, and possibly other sensors such as a localizer 430 and/or optical IR sensors 68. The computer 52 also receives pilot input from an inceptor 58. The computer 52 uses these inputs develop a virtual centerline reference—basically an internal computer model 260 of the position of centerline 250 of a runway 200. The system 50 uses these sensors to track the pointing direction 265 of the aircraft 270 as it travels down the runway. Computer 52 employs automatic methods to control actuators 60, 62 for the rudder 64 and/or the nose wheel 66 to conform the aircraft's pointing direction 265 to the model 260 of the runway centerline 250 as the aircraft rolls down the runway 200 and rotates into the sky. After rotation, the system 50 can use additional actuators and control surfaces (e.g., ailerons, roll spoilers) to control the aircraft 270 to continue to track the (extrapolated) runway centerline reference.

Generating a Virtual Centerline Reference

The non-limiting technology herein presents two example distinct methods that generate the runway centerline reference for takeoffs even in poor visibility conditions. A first method determines the runway centerline through a combination of both internal and external signals. For example, the implementation of the aircraft's inertial sensing units (accelerometers and gyrosensors) 54, provide internal signals, and the Localizer (LOC) 430 and/or the Differential Global Position System (DGPS) 56 provides external signals. In this method, the implemented system could allow for takeoff even in "no visibility" conditions, if and only if the system is proven to have enough accuracy to do so.

The second method encompasses a hybrid concept wherein the system 50 captures the track of the aircraft 270 in the initial takeoff roll (performed by the human pilot using inceptor 58) and uses the captured track for the rest of the takeoff run; i.e., it takes into account the course of the aircraft in the initial takeoff roll—that is determined by the pilot's inceptor inputs—and uses that determined course for the remainder of the takeoff. In addition, the combination of the Grounded Based Argumentation System (GBAS) (a system that provides differential correction to improve the accuracy of GPS 56) and/or the Differential Global Positioning Systems (DGPS) with the onboard inertial sensors 54 are used in conjunction with the method of capturing the track of the aircraft. The centerline generated from the initial run may be utilized by the automatic takeoff run until the aircraft 270 reaches an "automatic rotation" state at prescribed rotation velocity VR. The "automatic rotation" state is defined and produced in the same nature and manner as U.S. Pat. No. 8,793,040 B2, incorporated herein by reference.

The No/Low Visibility Auto-Takeoff (NLVTO) system 50 provided herein is capable of generating the runway centerline reference though many different techniques and combinations of techniques.

Hybrid: In this particular method, an initial estimation of runway centerline is based on a trajectory derived from pilot inputs. The pilot aligns the aircraft 270 with the runway and initiates the takeoff normally. As the aircraft accelerates, the system generates a reference for the aircraft to follow. After a prescribed speed or time, the system 50 takes over and automatically guides the aircraft down the runway. The aircraft 270 is able to follow the generated reference using its inertial sensors 54 by maintaining a certain heading associated with the generated reference.

GPS/GBAS: The system may use information from the GPS/GBAS 56 signal to create a centerline reference to follow at the beginning of the takeoff roll.

LOC/ILS (instrument landing system): The system uses information from the LOC/ILS 430 beam to create a centerline reference to follow at the beginning of the takeoff roll.

Multi-Spectral Image Processing: The system uses a multi-spectral image processing device, hardware and software implemented using for example optical sensors 68, to create a centerline reference to follow since the beginning of the takeoff roll. The centerline reference can be an ultraviolet (UV) marker or an infrared (IR) marker.

Combining multiple ones of the previously mentioned techniques can also be used to generate a runway centerline reference; this ability allows for redundancy of the generation of a runway centerline reference if one method fails.

Generating a Centerline Reference Using External Signals

Figure 7A:
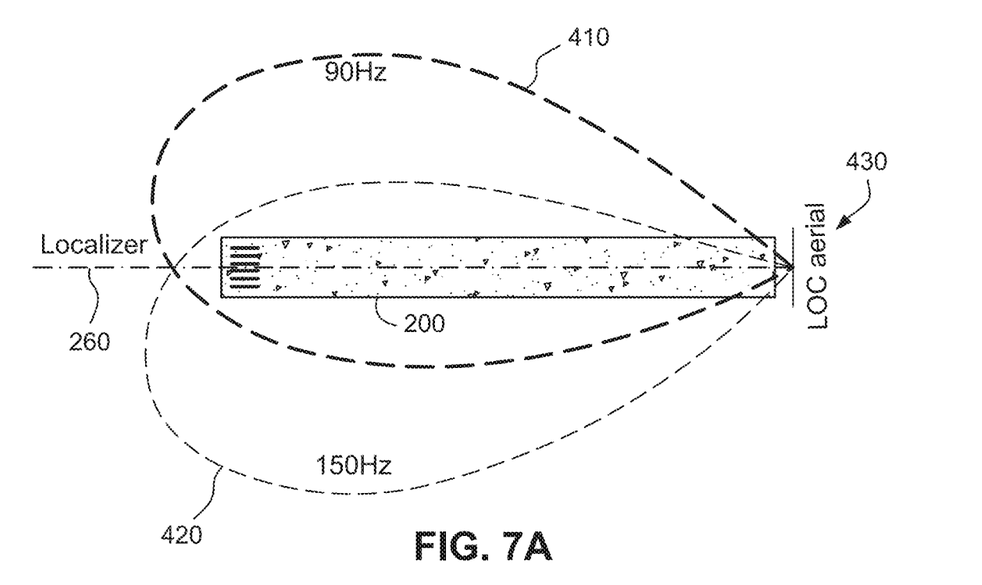
FIGS. 7A, 7B depict non-limiting techniques for generating a virtual centerline reference for the automatic takeoff system.
Figure 7B:
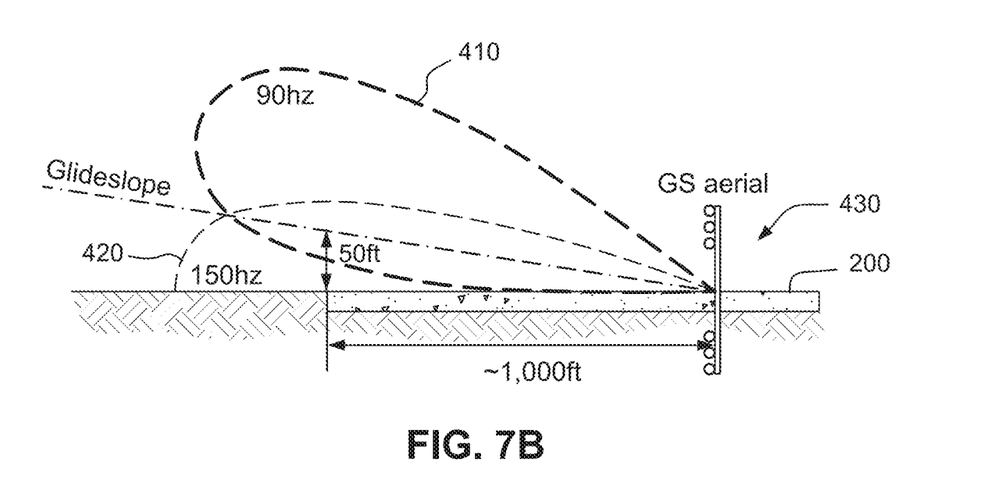

FIGS. 7A, 7B show example techniques for using external signals to generate a centerline reference 260. This method utilizes the Localizer 430, which transmits two signals to the aircraft on one of 40 ILS channels. One is modulated at 90 Hz 410, the other at 150 Hz 420. These are transmitted from co-located antennas 430. Each antenna transmits a narrow beam. This method is useful when there is no visibility of the runway centerline and the pilot cannot alight the aircraft and must rely on the centerline reference signal provided to the aircraft by the LOC 430.

Example Takeoff Scenario

Figure 2:
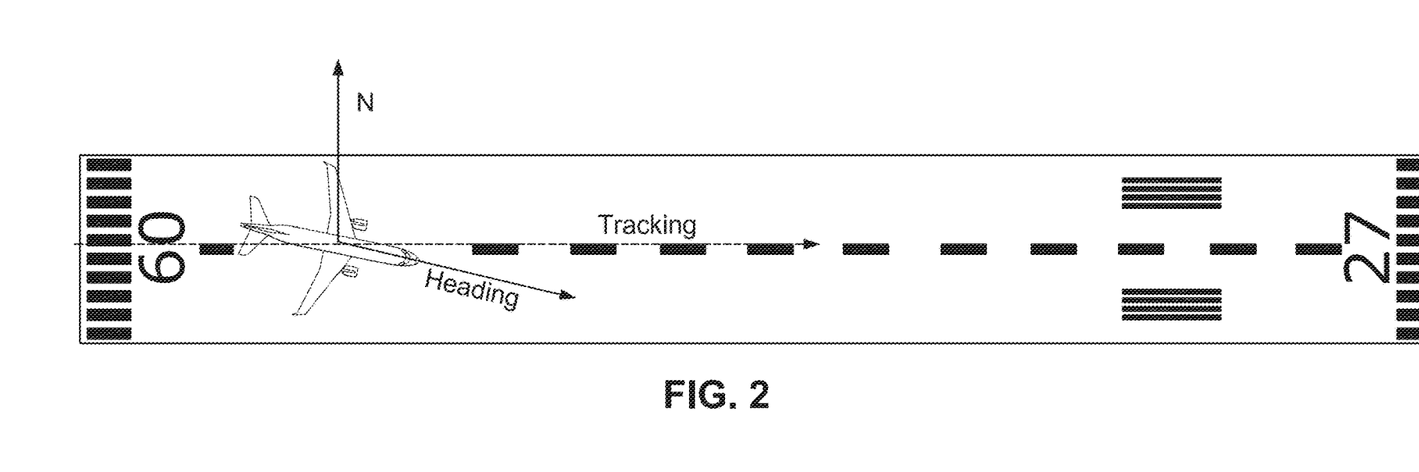
FIG. 2 shows a runway centerline and an aircraft with a heading that is to track the centerline.
Figure 3:
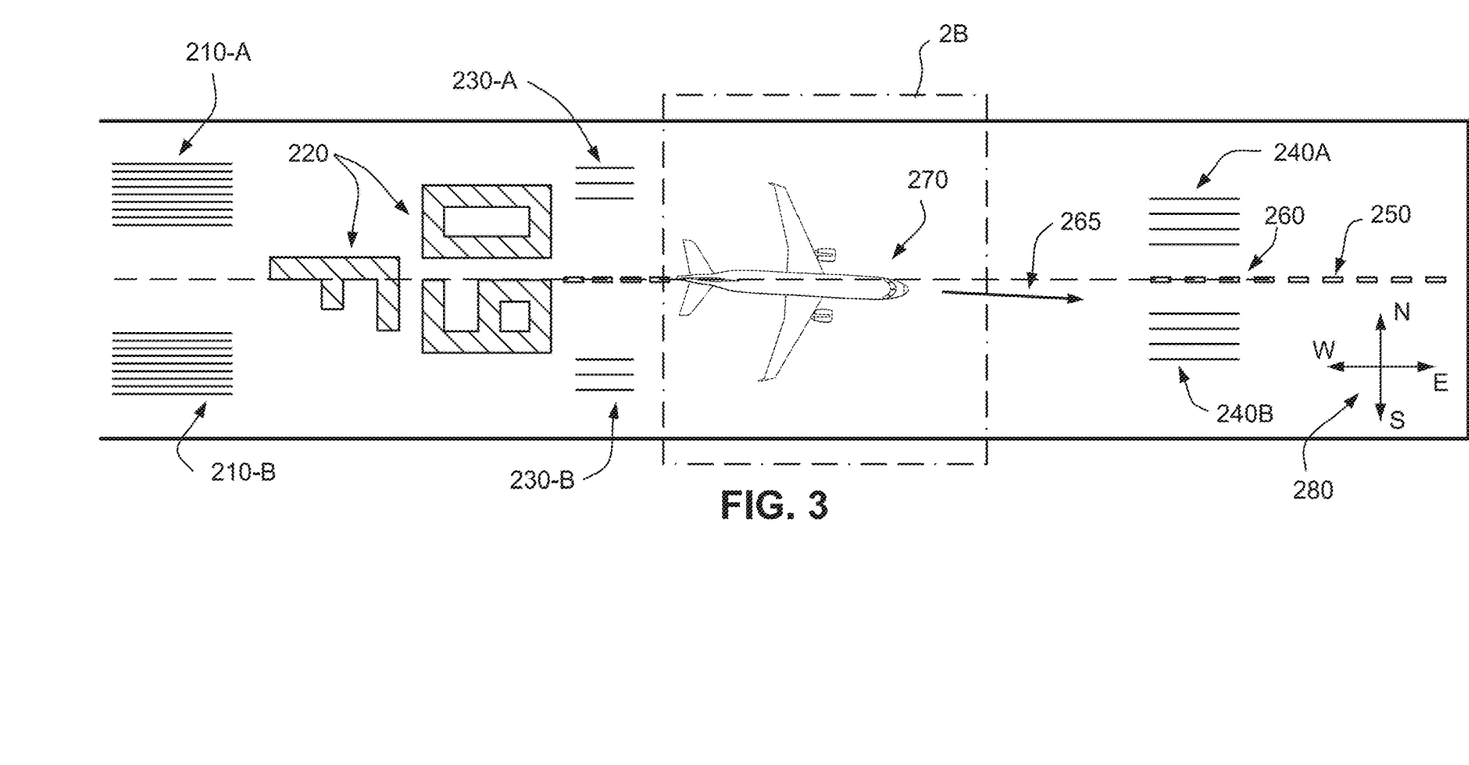
FIG. 3 is an illustration of a marked runway with an aircraft preparing for takeoff.

FIGS. 2 & 3 are illustrations of a runway 200 with an aircraft 270 preparing to takeoff in low visibility conditions. The runway of FIG. 3 has the following external markers:
  the thresholds (210-A, 210-B) (markings across the runway that denote the beginning and end of the designated space for landing and takeoff under non-emergency conditions),
  the runway address 220 (this is an identifier on the runway that identifies the runway),
  the touch down zones (230-A, 230-B) (these identify the touchdown zone for landing operations and are coded to provide distance information in 500 feet (150*m*) increments; these markings consist of groups of one, two, and three rectangular bars symmetrically arranged in pairs about the runway centerline),
  the fixed distance markings (240-A, 240-B), and
  the centerline marking 250.

See e.g., A Quick Reference to Airfield Standards, FAA (2018), incorporated herein by reference.

Along with the various markers, FIG. 3 depicts the pointing direction 265 of the aircraft 270, the generated (virtual) centerline reference 260, and a reference direction (e.g., true north, magnetic north, etc.) 280 of the aircraft.

In one example embodiment, the pointing direction 265 of the aircraft 270 is the direction the aircraft is currently pointing. The angle between the reference direction 280 and the direction in which the aircraft's nose is pointing make the heading of the aircraft 270. The reference direction 280, i.e., can be implemented in a non-limiting manner by the aircraft's 270 air navigation system (e.g., in the Flight Management System). Techniques by which the pointing positions are generated will be explained further down, as well as their intended use.

Figure 6:
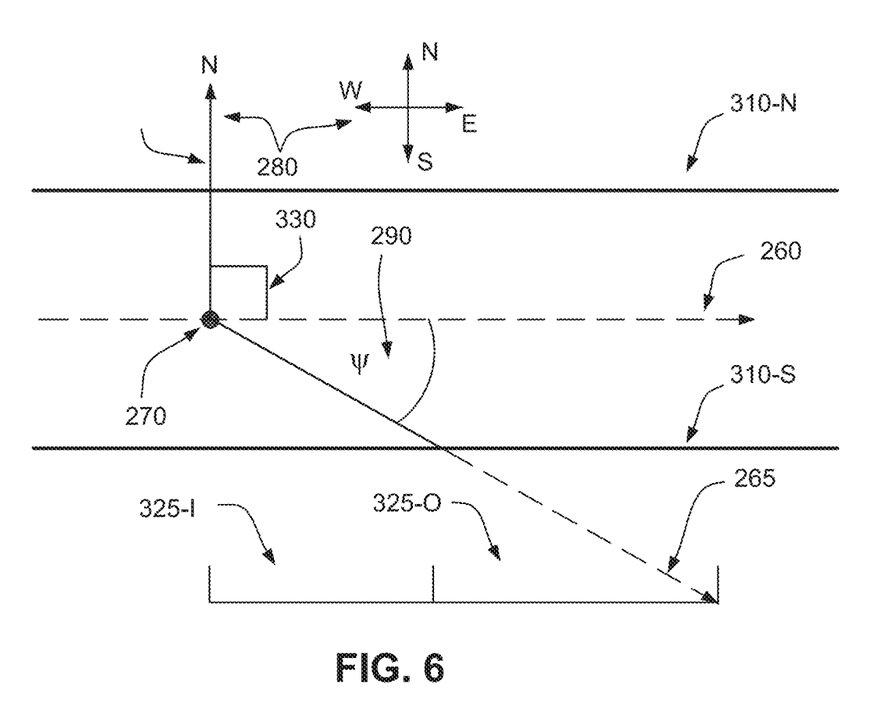
FIG. 6 depicts the FIG. 5's system's ability to minimize the deviation of the aircraft's heading and the aircraft's tracking to assure an aligned automatic takeoff.

A centerline reference 260 can be generated via any or all of the plethora of methods mentioned earlier. FIG. 6 shows in detail an example method for generating the centerline reference. In some embodiments, all components related to any type of direction are represented as vectors stored within a computer of the aircraft 270. These stored vectors can be calculated within the aircraft's system or inputted by a crew member.

Figure 4:
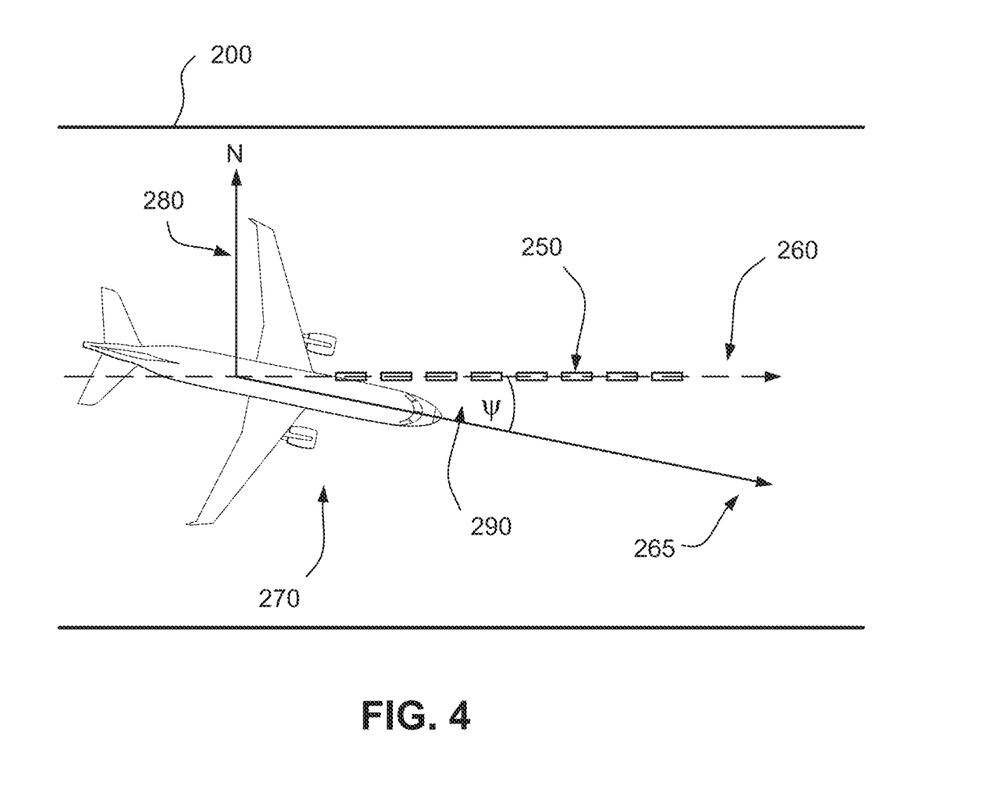
FIG. 4 is an expansion of FIG. 3 showing misalignment between the aircraft heading and the centerline of the runway.

FIG. 4 is a close-up view of the aircraft 270 in FIGS. 2 & 3. From this closer view, it is possible to see that the generated virtual centerline reference 260 is aligned with the runway's centerline 250. It is also possible to see that the aircraft's pointing direction 265 is not aligned with the runway's centerline 250. The deviation between the two vectors (centerline reference 260 and pointing direction 265) produce a heading angle ($\psi$) 290.

Additionally, in this non-limiting example, using polar coordinates, the reference direction 280 can be defined as the polar axis orthogonal with the centerline reference vector, and the current heading of the aircraft 265 points in the same direction of the virtual centerline reference 260 (the aircraft is defined as the pole).

Making the reference direction 280 orthogonal to the centerline reference 260 (North: reference direction 280, East: centerline reference 260) is only one example presented for simplification. Other arrangements using a Cartesian coordinate system and/or using different polar coordinates are possible. See e.g., Gelfand et al, "The Method of Coordinates" (Dover Publications 1967) incorporated herein by reference.

Furthermore, the reference direction 280 vector shown is determined at least partially by the aircraft's GPS, and is pointing North; it is determined to represent 0° and the centerline reference 260 represents 90°. Therefore, South is to be understood as 180° from the reference direction 280. It should be noted that the reason why the reference direction 280 vector points North and the centerline reference 260 vector points East is due to the fact that in this example explanation both vectors match the cardinal for the simplification of the explanation.

In FIG. 6 it is shown that the system is capable of minimizing the deviation of the aircraft's heading via the aircraft's tracking to assure an aligned automatic takeoff. The aircraft 270, represented here as a point-mass, has a heading angle ($\psi$) 290 from the centerline reference 260. In this example, the runway has a defined Northern hemisphere and a Southern hemisphere with the centerline reference as the boundary for the contiguous hemispheres. The Northern hemisphere has a Northern-boundary 310-N and the Southern hemisphere has a Southern boundary 310-S.

The two boundaries are the limits for the aircraft heading vector 265 of the system. To understand how the boundaries work, the vectors can be represented in a non-limiting example, as vector projections. The heading vector 265 projects in the allowable deviation range 325-I (Inside the Range), the aircraft may continue to accelerate down the runway as long as this projection is within the allowable deviation range 325-I. If the heading vectors 265 projects outside of the allowable range and projects in the range of exceedance 325-O (Outside the Range), then system 50 must correct the aircraft 270's heading vector 265.

Since it is known that the reference direction 280 is orthogonal to the centerline reference 260, it can be deduced that the reference direction vector 280 and the heading angle (ψ) 290 make an aircraft pointing direction 265 with a value of 90°+ψ. If the heading vector 265 were on the Northern hemisphere, the system would consider the difference between both values (90°−ψ) rather than the summation to find the aircraft pointing direction 265. The system is configured to converge the sum or difference of both vectors to a value of 90° so that the heading vector 265 and the centerline reference can be aligned 260.

The system 50 assures using three methods that the aircraft has a correct heading vector 265 for takeoff. The first method ensures the capability to stay within the Northern-boundary 310-N and Southern boundary 310-S by checking that the projections are in the allowable deviation range 325-I so the aircraft can keep accelerating down the runway. As the heading angle 290 converges to zero, the allowable deviation 325-I increase while the range of exceedance 325-O decreases. The second method relies on the aircraft's navigation capabilities to understand its heading (heading vector 265) relative to the virtual centerline reference 260 and minimizes the heading angle 290 between the two vectors. The third method is a hybrid method wherein the pilot lines up the aircraft 270 with the centerline reference 260 and/or the centerline 250 during the takeoff roll until the system is able to capture an appropriate pointing direction 265 for the aircraft, and takeover the alignment of the aircraft 270 until takeoff is complete.

All three non-limiting methods receive data from an inertial sensor(s) 54 within the aircraft to check and maintain a correct pointing direction 265, furthermore the actuation that changes the pointing direction 265 is executed by the flight control surfaces (ailerons, roll spoilers, rudder, etc.) and the nose-steering.

Given a centerline reference, the system will act on the control surfaces (ailerons, roll spoilers, rudder, nose steering, etc.) in order to track a heading reference thus keeping the airplane within runway limits, parallel to the centerline. It measures, through the aircraft sensors, the heading angle "ψ", compares it to the reference angle, obtained at the initiation of the takeoff roll, and applies a control logic through the FBW computer to reduce the error between the current measured "ψ" and the reference "ψ".

During the ground roll, the lateral control surfaces are used secondarily to help control, based on a prescribed control logic. Once the aircraft is in the air, the control law will act on both the lateral and the directional control surfaces primarily, in order to track a heading "ψ" and a bank "φ" references.

Example More Detailed Block System Diagram

Figure 8:
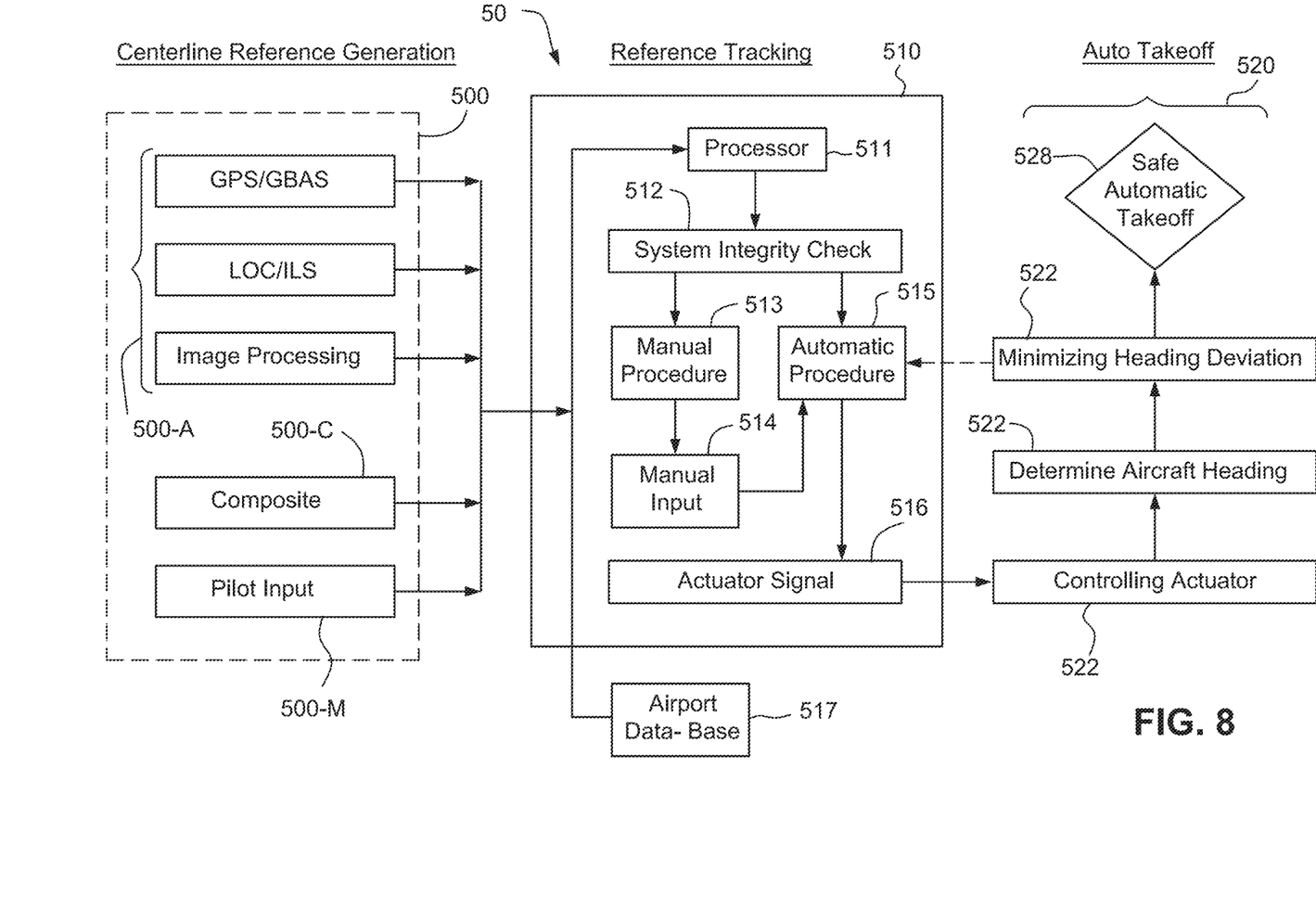
FIG. 8 is a more detailed schematic block diagram of an example non-limiting automatic takeoff system.

FIG. 8 illustrates three parts of system 50 that help assure an automatic takeoff in low visibility conditions. The first phase or part 500 is the centerline reference generation 500, the second phase or part 510 is the reference tracking 510, and the last phase or part 520 is the aircraft's takeoff roll 520. These phases or parts 500, 510, 520 can be implemented any number of ways including for example software running on one or more processors, hardware logic, firmware, custom ASICs, etc.

The generating phase 500 implements methods already described for generating a centerline reference for takeoff One of the automatic techniques 500-A was described in detail on FIG. 7A, 7B. The manual technique 500-M uses pilot input so that the system has an appropriate pointing direction 265 for takeoff. An additional method is the composite technique 500-C that consists of the implementation of combinations of any of the previously mentioned techniques for generating the centerline reference. In the manual technique, the computer 52 acquires and stores a succession of data points indicative of headings of the aircraft as the pilot steers the aircraft down the runway along the runway centerline. The computer 52 uses this succession of data points to generate an internal centerline reference (vector) in two-dimensional space. The computer 52 is capable of acquiring such an internal centerline reference using the automatic techniques described above. In some embodiments, the centerline reference is defined by a vector relative to an initial position of the aircraft.

The second phase 510 of the automatic takeoff system is where the centerline reference tracking guides the aircraft along the determined vector in the correct heading. The data transmitted by the airport data base 517, along with the data from the automatic techniques 500-A, or manual technique 500-M, or the composite technique 500-C is processed in a processor 511 within an aircraft computer 52. In the system integrity check 512, the processor 511 determines whether there is enough data to generate an appropriate centerline reference 260 for the pointing direction 265 to track. If the system has enough information to generate the centerline reference 260 and enough integrity to track the reference, then the system uses an automatic procedure 515 for the takeoff roll. If the system does not have enough information to generate a centerline reference and/or does not have the integrity to track the reference, then the takeoff roll is started manually 513.

In the manual procedure 513, the system captures the track of the aircraft in the initial takeoff roll (performed by the human pilot) and uses it for the rest of the takeoff run. In other words, the system is configured to receive information from the pilot manual alignment of the aircraft pointing direction 265 and the centerline (250, 260) and changes to an automatic procedure 515 when the system is able to validate a safe takeoff Once the system is operating in the automatic procedure 515, it produces signals to control the actuator of the aircraft. The actuator provides corrections to the pointing direction 265 by receiving instructions from the aircraft computer 52 that monitors the readings of the inertial sensor(s) 54 and assures that the pointing direction 265 remains aligned throughout the takeoff run. The system, using both the Flight Management System (e.g., FBW control law) and the inertial sensor(s) 54, determines the aircraft's current pointing heading 524 and minimizes deviation between the current pointing heading 524 vector and the centerline reference by automatically operating actuators 62, 64, to control the heading of the aircraft. It does this in a repetitive, continual manner so the two vectors remain closely aligned as the aircraft rolls down the runway.

The convergence, or the process of the approximation of the two vectors, is what gives the system the ability to do a safe automatic takeoff 528 even in conditions where visibility is poor or in conditions where the heading is affected by environmental factors.

Example Abbreviations

DGPS—Differential Global Position System
GBAS—Grounded Based Augmentation System
HUD—Head-Up-Display
ILS—Instrument Landing System
IR—Infrared
LOC—Localizer
LVTO—Low Visibility Takeoff
NLVTO—No/Low Visibility Takeoff
UV—Ultraviolet
VR—Rotation speed While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An automatic takeoff system capable of operating in low or no visibility conditions, the system comprising:
  a sensor onboard an aircraft, configured to sense pointing direction of the aircraft; and
  at least one processor configured to create a virtual centerline reference as the aircraft rolls down a runway for takeoff by calculating a trajectory based on pilot inceptor inputs that control the aircraft as the aircraft rolls down the runway during a portion of a takeoff roll, the calculated trajectory indicating the track the aircraft follows down the runway under control of the pilot inceptor inputs as the aircraft is executing the portion of the takeoff roll, the processor being further configured to compare deviation between sensed pointing direction of the aircraft and the created virtual centerline reference and automatically output an actuator control signal that conforms aircraft pointing direction to the created virtual centerline reference.

2. The system of claim 1, wherein the created virtual centerline reference is generated also in response to data obtained from any or all of the following supplementary input: a Differential Global Position System, a Grounded Based Augmentation System, an Instrument Landing System, a Localizer, and a Multi-Spectral Image Processing System without requiring visual identification of runway centerline visual markings.

3. The system of claim 2, wherein the at least one processor is capable of determining whether the data is sufficient to compare the value of the created virtual centerline reference and the value of the current pointing direction or if additional input is required.

4. The system of claim 1, wherein the processor is further configured to determine whether an inertial sensor indicates alignment of the current pointing direction of the aircraft with the created virtual centerline reference before and after rotation of the aircraft.

5. The system of claim 1, wherein, the processor is further configured to store a sequence of current pointing directions of the aircraft during takeoff ground roll as the aircraft travels down the runway and send control signals to the actuator to provide corrections when inertial sensors sense that the pointing direction of the aircraft has deviated from the created centerline reference.

6. The system of claim 1, wherein the processor is configured to receive a feedback signal from inertial sensors that repetitively updates the aircraft current pointing direction during the takeoff.

7. A method for automatically controlling an aircraft comprising:
  (a) using at least one processor, calculating a trajectory in response to pilot inceptor inputs that control the aircraft as the aircraft travels down the runway during a portion of a takeoff roll, and using the calculated trajectory to generate a virtual centerline reference that is indicative of the track of a manually-steered aircraft during the portion of a takeoff roll; and
  (b) using the at least one processor, controlling automatically the heading of the aircraft, so that the aircraft follows the track of the virtual centerline reference while on a later portion of takeoff.

8. The method of claim 7 further including repetitively determining an updated current heading of the aircraft via an inertial sensor and providing the updated current heading to a virtual centerline reference tracker.

9. The method of claim 7 further including determining the deviation between the virtual centerline reference and the current heading of the aircraft via the virtual centerline reference tracker of the system.

10. The method of claim 7 further including providing correction signals, via an internal computer, from the virtual centerline reference tracker, to an actuator that controls a least one control surface and/or one-wheel steering.

11. A system comprising at least one processor on board an aircraft configured to perform operations comprising:
  virtual centerline reference and heading acquisition that calculates a trajectory based on pilot inceptor inputs controlling the aircraft as the aircraft travels down a runway during a portion of a takeoff ground roll, uses the calculated trajectory to create a virtual centerline reference and heading and provides an initial vector which is obtained based on an initial position of the aircraft at a first piloted initiation of the takeoff roll; and
  virtual centerline tracking that controls the aircraft to automatically track the created virtual centerline-reference by automatically correcting aircraft heading upon the path of the aircraft deviating during takeoff from the created virtual centerline reference.

12. The system of claim 11 wherein the system includes at least one processor configured to act on aircraft control surfaces to minimize lateral distance between the aircraft and the created virtual centerline reference.

13. The system of claim 11 wherein the processor is further configured to, during a ground roll, use lateral control surfaces secondarily to control the aircraft, based on a prescribed control logic.

14. The system of claim 13 wherein the control logic is configured to act on both lateral and the directional control surfaces primarily, in order to track a heading "$\psi$" reference and, once the aircraft is in the air, a bank "$\phi$" reference.

15. The system of claim 11 wherein the processor is further configured to act on aircraft control surfaces in order to track a heading reference thus keeping the aircraft within runway limits, parallel to the created virtual centerline reference.

16. The system of claim 11 wherein the processor is further configured to measure, through aircraft sensors, a heading angle "$\psi$", compare it to a reference angle, obtained at an initiation of a takeoff roll, and apply a control logic through a fly by wire computer to reduce error between the measured heading "$\psi$" and the reference angle.

17. The system of claim 11 wherein, the processor is further configured to use lateral control surfaces secondarily to help control the aircraft during the ground roll, based on a prescribed control logic.

18. The system of claim 17 wherein the control logic is configured to act on both lateral and directional control surfaces primarily, to track a heading "$\psi$" and a bank "$\phi$" references once the aircraft is in the air.

\* \* \* \* \*